July 23, 1968     W. A. NOLAN     3,393,487
THERMALLY INSULATING JOINT CONSTRUCTION
Filed Oct. 6, 1966     3 Sheets-Sheet 1
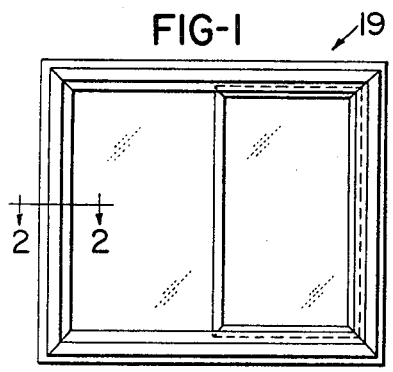
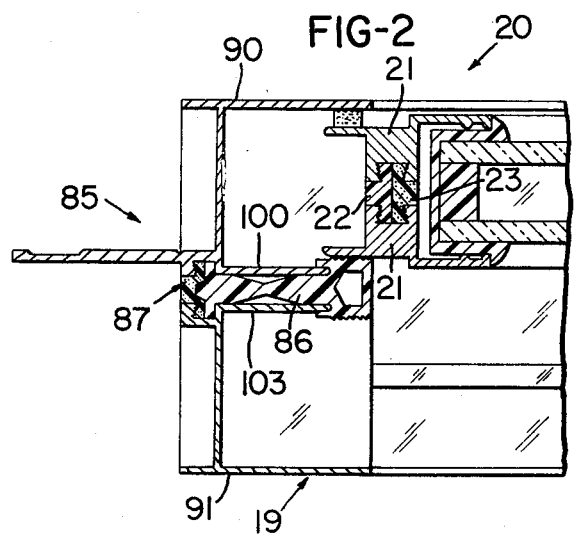
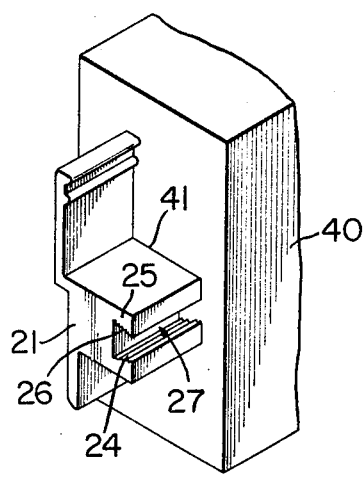
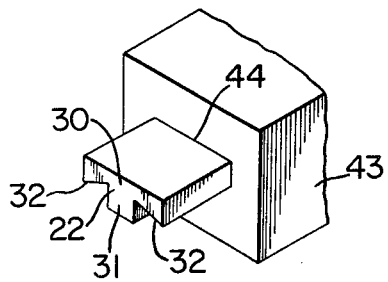
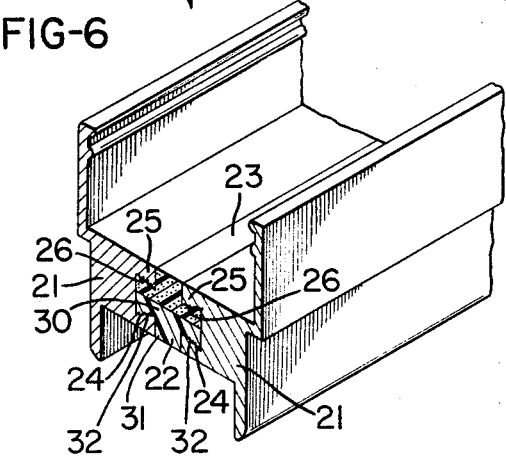
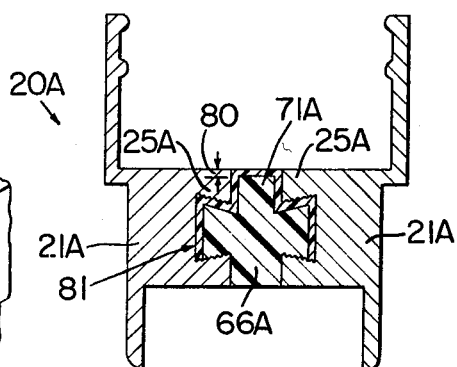
INVENTOR.
WILLIAM A. NOLAN
BY *Glenn Palmer,*
*Matthews & Lyne*
HIS ATTORNEYS

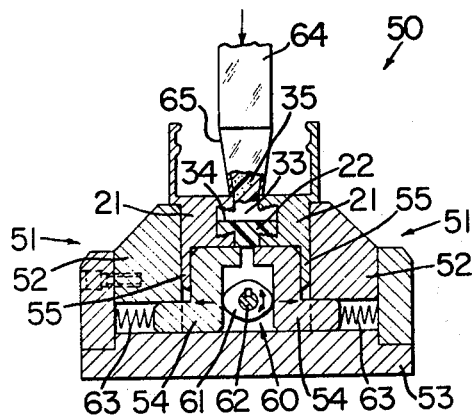
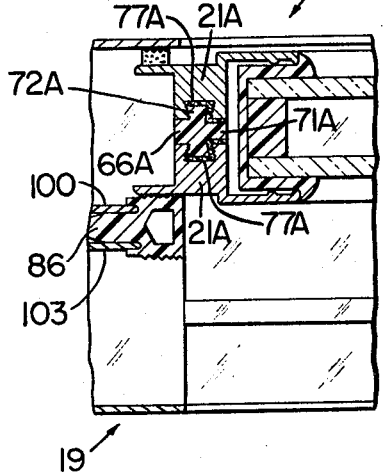
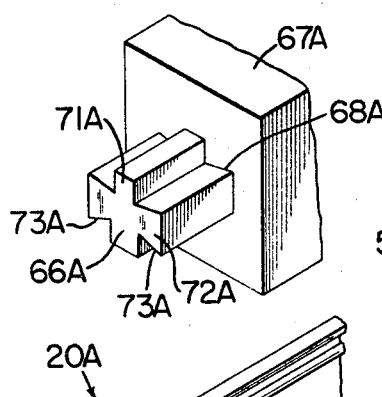
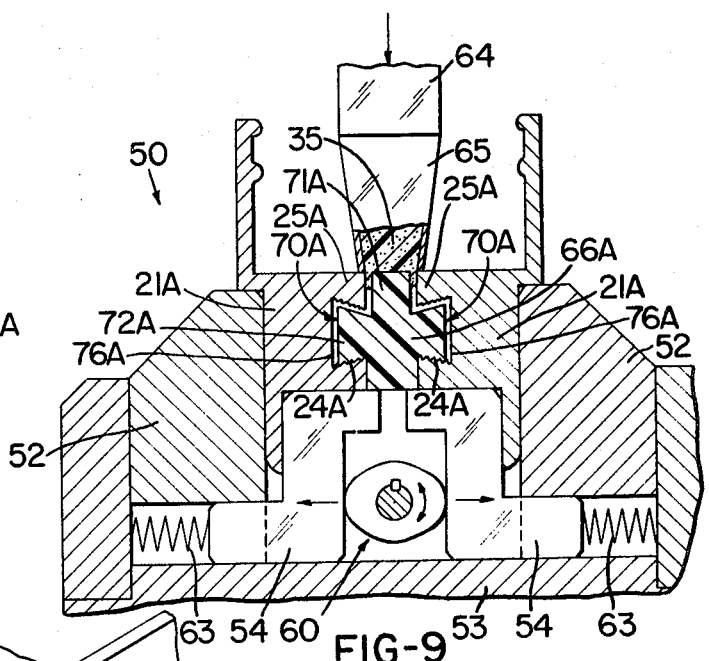
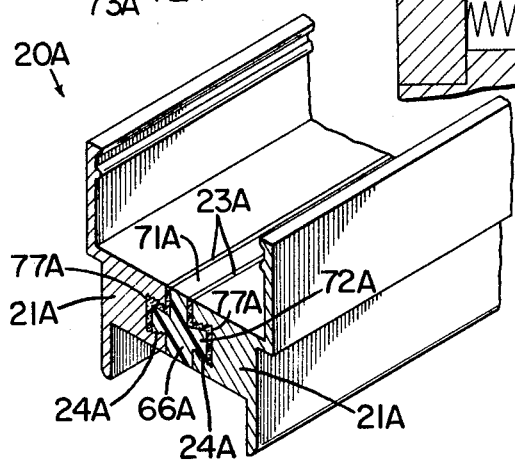

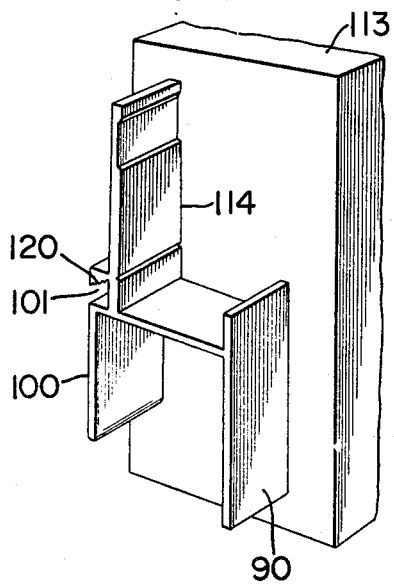
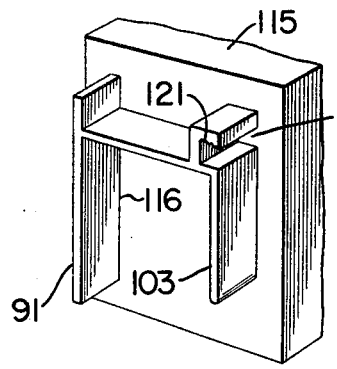
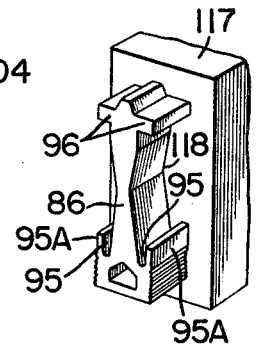
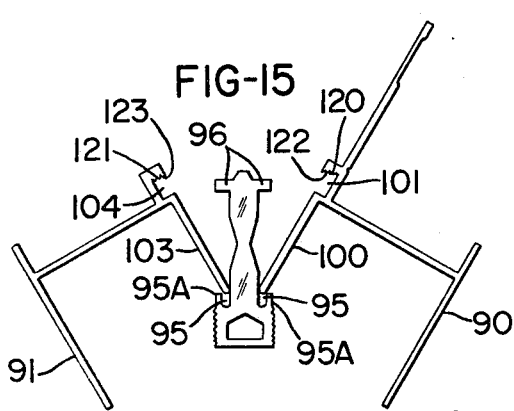
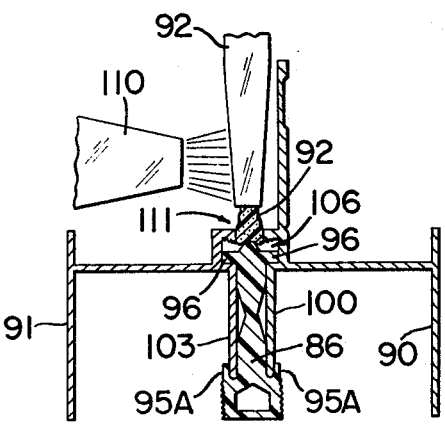
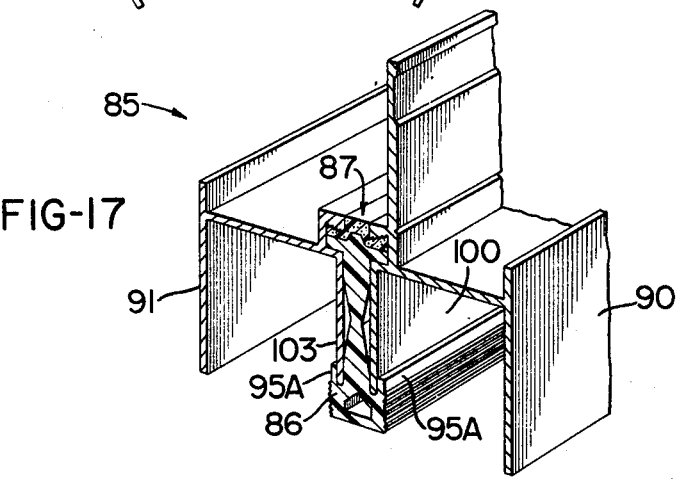

United States Patent Office 3,393,487
Patented July 23, 1968

3,393,487
THERMALLY INSULATING JOINT
CONSTRUCTION
William A. Nolan, Louisville, Ky., assignor to Reynolds
Metals Company, Richmond, Va., a corporation of
Delaware
Filed Oct. 6, 1966, Ser. No. 584,901
22 Claims. (Cl. 52—403)

This invention pertains to thermal insulating means and more particularly to an improved thermally insulating joint construction and to an apparatus for and method of making such improved joint construction.

The known problem in utilizing windows, doors, and the like, made with metal frame members is to thermally isolate such frame members from adjoining supporting structure to avoid undesirable condensation. While such problem is readily apparent the constructions used in attempting to solve such problem have been many and varied and all have their basic limitations. Many of such previous constructions and apparatus for and methods of making such constructions are much too complicated and expensive to be used competitively in industry.

Accordingly, it is a feature of this invention to provide an improved thermally insulating joint construction which is of simple and economical construction.

Another feature of this invention is to provide an improved thermally insulating joint construction comprised of a pair of spaced apart elongated metallic structural members which are fastened together utilizing a solid first thermal insulating member which is used with such pair of members to define channel means and further utilizing a second thermal insulating member which is formed in such channel means by flowing molten plastic material therein and upon solidification thereof interlocks such metallic members and thermal insulating members together as an integral unit.

Another feature of this invention is to provide a thermally insulating joint construction utilizing the structural configuration of a solid thermal insulating member cooperating with the structural configurations of a pair of associated elongated metallic structural members to define contoured channel means in which the contours thereof enable forming of an interlocked assembly of high strength upon flowing a liquid plastic material within such channel means and allowing it to solidify.

Another feature of this invention is to provide a thermally insulating joint construction utilizing a centrally arranged thermal insulating member having a pair of oppositely arranged surface means therein adapted to fasten one end portion of an associated pair of metallic structural members, such structural members having groove means at their opposite end portions which cooperate with surface means of such thermal insulating member to define channel means for receiving liquid plastic materal therein and such plastic material is adapted to solidify to lock the assembly together.

Another feature of this invention is to provide an improved apparatus for making a thermally insulating joint construction of the character mentioned which is readily used to produce such joint construction in production quantities.

Another feature of this inveniton is to provide such improved apparatus comprised of component members which are inexpensive to produce and maintain in proper operating condition.

Another feature of this invention is to provide an improved apparatus of the character mentioned for making such an improved joint ocnstruction comprising fixture means for holding a pair of elongated metallic structural members in spaced apart parallel relation with a solid thermal insulating member means intially loosely arranged therebetween so that its top portion defines bottom wall means of channel means thus enabling a molten thermoplastic material to be poured in such channel means to weld the two elongated structural members together in spaced apart thermally insulated relation.

Another feature of this invention is to provide an improved method of making such a thermally insulating joint construction which is easily adapted to be used in making such joint constructions of all types and configurations in an economical manner.

Another feature of this invention is to provide an improved method of making such a joint construction which utilizes both a solid thermal insulating member in cooperation with a liquid thermal insulating material to weld together a pair of spaced apart elongated structural members to provide such a joint construction of high strength in a simple and efficient manner.

Another feature of this invention is to provide an improved method of making such an improved joint construction which lends itself to using simple equipment to provide such joint construction in high production quantities.

Therefore, it is an object of this invention to provide an improved joint construction and an improved apparatus for and method of making such improved joint construction having one or more of the novel features of this invention as set forth above or hereinafter shown or described.

Other objects, uses, and advantages of this invention are apparent from a reading of this description which proceeds with reference to the accompanying drawings forming a part thereof and wherein:

FIGURE 1 is a front view of an exemplary double section window construction having a fixed window section and a slidable window section and utilizing two embodiments of the thermally insulating joint construction of this invention.

FIGURE 2 is a sectional view on the line 2—2 of FIGURE 1 particularly illustrating one exemplary embodiment of the thermally insulating joint construction of this invention being used as a glass support assembly and the other embodiment being used as outer frame means for such window contsruction.

FIGURE 3 is a perspective view with parts broken away illustrating elongated metallic structural member means used to form the glass support assembly of this example of the invention and illustrating a porticn of extrusion die means used to form such metallic structural member means as an integral unit.

FIGURE 4 is a perspective view with parts brcken away illustrating an elonga'ed T-shaped thermal insulating member utilized with the metallic structural member of FIGURE 3 and illustrating a portion of extrusion die means used to form such T-shaped member as an integral unit.

FIGURE 5 is a view wi.h parts in section and parts broken away of an exemplary apparatus utilized to form the thermally insulating joint construction comprising the glass support assembly of FIGURE 2 and showing nozzle means utilized to introduce a molten plasic material into the partially formed construction, FIGURE 6 is an enlarged fragmentary perspective view illustrating the thermally insulating joint construction as completely formed by the apparatus of FIGURE 5.

FIGURE 7 is a fragmentary sectional view similar to FIGURE 2 illustrating another embodiment of the thermally insulating joint construction of this invention also used as a glass support assembly and adapted to be used interchangeably wi:h the glass support assembly of FIGURE 2.

FIGURE 8 is a perspective view with parts broken away illustrating an elongated cross-shaped thermal insulating member utilized in the joint construction of FIGURE 7 and illustrating a portion of extrusion die means used to form such cross-shaped member.

FIGURE 9 is an enlarged view similar to FIGURE 5 of the drawings illustrating the manner of forming the thermally insulating joint construction of FIGURE 7 by flowing liquid plastic into a pair of substantially Z-shaped channels on opposite sides of its central cross-shaped member.

FIGURE 10 is a perspective view with parts broken away illustrating the completed thermally insulating joint construction formed by the apparatus of FIGURE 9.

FIGURE 11 is a modification of the joint construction of FIGURE 10 in which the cross-shaped member has the top portion of its vertical member partially cut away to enable flowing liquid plastic thermal insulating material thereacross to thereby provide an integral bond between the substantially Z-shaped channels on either side of such cross-shaped member.

FIGURE 12 is a perspective view with parts broken away illustrating one elongated metallic structural member means of a cooperating pair of such member means used to form the outer frame means for the window construction of this example of the invention and illustrating a portion of extrusion die means used to form such elongated metallic structural member means as an integral unit.

FIGURE 13 is a perspective view with parts broken away of the other of such cooperating pair of elongated metallic structural member means used to form such outer frame means and also illustrating a portion of extrusion die means used to form such other metallic structural member means as an integral unit.

FIGURE 14 is a perspective view with parts broken away illustrating a preformed central thermal insulating member utilized with the metallic structural members of FIGURES 12 and 13 to form the outer frame means of the window construction illustrated in FIGURE 1.

FIGURE 15 is an end view illustrating the manner of assemblying the elongated metallic structural members of FIGURES 12 and 13 in cooperating relation on opposite sides of the thermal insulating member of FIGURE 14.

FIGURE 16 is a sectional view of the members illustrated in FIGURE 15 assembled together and showing the manner of melting a plastic material in channel means defined by the upper end portions of such assembled members, such molten plastic material being adapted to cool and solidify to interlock such members together as a high strength structural unit.

FIGURE 17 is an enlarged fragmentary perspective view illustrating the thermally insulating joint construction forming the outer frame means of the window of FIGURE 1.

While the various features of this invention are hereinafter illustrated and described as being particularly adaptable for providing an improved thermally insulating joint construction and an improved apparatus for and method of making such improved joint construction particularly adapted for use in a window construction, door construction, or the like, it will be appreciated that the various features of this invention can be utilized singly or in any combination thereof to provide a thermally insulating joint construction for other uses as desired.

Therefore, this invention is not to be limited to only the embodiments illustrated in the drawings because the drawings are merely utilized to illustrate one of the wide variety of uses of this invention.

In the exemplary embodiment of the glass support assembly of this invention as particularly illustrated in FIGURES 2 and 6 of of the drawings, a thermally insulating joint construction designated generally by the numeral 20 and comprising a portion of a two section window 19 is illustrated. Joint construction 20 is comprised of a pair of spaced apart elongated structural member means or metallic structural members each designated by the numeral 21 and a pair of thermal insulating members designated by the numerals 22 and 23 arranged between spaced apart members 21 to bond members 21 together and thermally isolate such members from each other. Insulating member 22 is made as a preformed solid unit, loosely assembled between structural members 21, and such member cooperates with portions of members 21 to define channel means within which a liquid plastic material is poured or flowed and allowed to solidify to form insulating member 23. Solidified member 23 interlocks members 21 together to form the improved construction 20 as will be described in detail subsequently.

Each elongated metallic structural member 21 has supporting surface means such as an inclined supporting surface 24 which in the illustration presented in FIGURE 6 of the drawings is inclined at an acute angle with respect to a horizontal plane. Each structural member 21 also comprises projection means shown as a projection 25 extending laterally in roughly the same direction as supporting surface 24. Projection 25 has an inclined lower surface 26 which is similar to surface 24 and symmetrically arranged with respect thereto. Surfaces 24 and 26 in this example of the invention cooperate with a portion of member 21 arranged therebetween at their base portions to define a substantially U-shaped groove therealong designated by the numeral 27 in FIGURE 3 of the drawings.

The thermal insulating member means or thermal insulating member 22 in this exemplary embodiment of the invention is a substantially T-shaped member having transverse bar means or a transverse bar 30 extending thereacross above a vertical member 31. The opposite terminal lower end portions of transverse bar 30 define supported surface means each designated by the numeral 32 and each adapted to be supported on inclined supporting surfaces 24.

As will be apparent from FIGURE 5 of the drawings, the oppositely arranged structural members 21 cooperate with T-shaped member 22 to define channel means shown as a substantially inverted T-shaped channel 33 extending along joint construction 20. The bottom wall means or bottom wall of channel 33 is defined by upper surface means of transverse bar 30 and designated by the numeral 34 and the side walls of such channel are defined by portions of members 21.

Channel 33 is adapted to receive a liquid plastic material therewithin, designated by the numeral 35, which solidifies within such channel to form member 23. Insulating member 23 is thus integrally formed within construction 20 and has a substantially T-shaped outline corresponding to channel 33.

Member 23 is preferably formed by melting a thermoplastic insulating material and while such thermoplastic material is in a liquid state, as indicated by the numeral 35 in FIGURE 5, the molten material is poured or flowed through suitable nozzle means into channel 33. Upon cooling molten material 35 solidifies and forms thermal insulating member 23.

Thus, it is seen that the thermally insulating joint construction 20 is formed using a pair of identical symmetrically arranged elongated metallic structural members 21 arranged and held in spaced apart relation, using a suitable apparatus to be later described, and solid thermal insulating member 22 is supported by members 21 therebetween and cooperates with such members to form channel 33. Liquid plastic or rubber-like insulating material 35 is then flowed or forced within channel 33 and as will be apparent from FIGURES 5 and 6 such liquid material fills T-shaped channel 33. Upon solidfying the angled surfaces 24 and 26 assure that an integral wedged construction is provided to hold members 21 together and thereby form unit 20 having high strength.

Each elongate structural member 21 is preferably a metallic member which is made preferably as an integral unit by extrusion through suitable die means or die 40 as seen in FIGURE 3 of the drawings. Die 40 has opening means 41 therein corresponding to the configuration of member 21 and upon extruding member 21 therethrough an integral unit having high structural strength is provided.

In a similar manner T-shaped solid insulating member 22 of this exemplary embodiment of the invention is preferably made of a thermoplastic material such as polyvinyl chloride, polyethylene, or the like, and is also made as an integral unit preferably by the extrusion process. As seen in FIGURE 4 of the drawings, member 22 is extruded through suitable die means 43 having opening means 44 therein corresponding to the T-shaped peripheral configuration of thermal insulating member 22.

An exemplary apparatus used to form thermally insulating joint construction 20 is illustrated in FIGURE 5 of the drawings and is designated generally by the numeral 50. Apparatus 50 comprises supporting means shown as supporting block means comprised of a pair of supporting block assemblies each designated by the numeral 51 and arranged on opposite sides of apparatus 50. Each supporting block assembly 51 is adapted to support an associated elongated structural member 21 as will be presently described.

Each supporting block assembly 51 comprises a first supporting block 52 which is supported in a fixed position with respect to a base portion 53 of apparatus 50 and a second supporting block, illustrated as a horizontally movable supporting block 54, which is adapted to cooperate with fixed block 52 to clamp and rigidly hold a selected portion 55 of an associated elongated structural member 21 therebetween. Each movable block 54 is adapted to move horizontally toward and away from its associated fixed block 52.

Supporting blocks 52 and 54 are preferably elongated blocks arranged to extend horizontally so as to support elongated structural members 21 in a horizontal manner and upon inserting T-shaped member 22 therebetween with its supported surfaces 32 supported on associated supporting surfaces 24 and suitably positioning members 21 using positioning means to be subsequently described, channel 33 is formed by members 21 and 22 and it also extends horizontally. Such horizontal arrangements of channel 33 enable plastic material 35 to be more easily flowed therein.

The above mentioned positioning means provided for positioning each elongated structural member 21 on apparatus 50 comprises actuating means such as an actuator assembly designated generally by the number 60 which engages and horizontally moves each supporting block 54 toward its associated fixed supporting block 52 to thereby clamp lower end portion 55 of an associated structural member 21 therebetween. In this exemplary apparatus, actuator 60 is arranged within members 21 so as to simultaneously move supporting blocks 54 outwardly toward their associated blocks 52. However, it will be appreciated that the actuating means for positioning and properly aligning each member 21 may be arranged on the exterior side of one or both members 21 in cooperation with suitable supporting blocks to support and align members 21.

With structural members 21 properly positioned in a horizontal spaced apart manner as illustrated in FIGURE 5 of the drawings, T-shaped thermal insulating member 22 is inserted therebetween as illustrated in FIGURE 5 of the drawings to define elongated channel 33, as previously mentioned. Actuator assembly 60 fixes the configuration of channel 33 so that liquid, preferably molten, plastic material can be flowed therein and allowed to solidify and fasten the spaced apart elongated structural members 2 to form assembly 20.

Actuating means 60 in this example of the invention comprises an approximately elliptical cam 61 which is suitably keyed to a shaft 62 supported between assemblies 51 comprising apparatus 50. Elliptical cam 61 is rotated through ninety degree angular increments in an indexing manner by any suitable rotary actuator.

The clamping movement of each movable supporting block 54 is achieved by rotating elliptical cam 61 so that a line through its foci extends essentially horizontally, as seen in FIGURE 5. Upon rotating cam 61 so that a line through its foci extends vertically, the clamping action is eliminated and each block 54 is moved away from its associated fixed block by suitable urging means provided therewith.

The urging means provided with each supporting block assembly 51 of this exemplary apparatus comprises spring 63 engaging the lower end portion of its movable supporting block 54 and urges it away from its fixed supporting block 52. This movement is confined within a limited distance as defined in this particular example of the invention by the difference between the width of elliptical cam 61 across its minor axis and the width across its major axis. The movement of each block 54 away from its associated fixed block 52 enables easy insertion of the lower end portion 55 of each member 21 between supporting blocks 52 and 54.

Thus, it will be seen that elongated structural members 21 are easily inserted between their associated blocks 52 and 54 and initially loosely held. T-shaped solid thermal insulating member 22 is then inserted in position and actuator 60 is actuated urging the movable supporting blocks 54 outwardly toward their associated fixed supporting blocks 52 thereby clamping lower end portion 55 of each member 21 firmly in position to fix the configuration of channel 33 thus defined.

Means is provided for flowing liquid plastic material 35 within channel 33 to form a thermal insulating member designated by the numeral 23 in its solid condition. In this example of the invention such means for flowing liquid plastic material comprises supply means shown as a supply conduit 64 for supplying molten thermoplastic material and nozzle means shown as a nozzle 65 fastened in flow relation at the terminal end of supply conduit 64.

Conduit 64 with nozzle 65 flows the molten plastic material into channel 33 as seen in FIGURE 5. The actuator assembly 60 is held actuated to thereby hold the elongated structural members 21 firmly in position until the molten thermoplastic material cools and solidifies to define inverted T-shaped member 23.

The exemplary apparatus 50 used to form construction 20 and method of forming such construction utilizes only that amount of plastic material which is required and without wasting such plastic material. Upon cooling, the thermoplastic material 35 forming member 23 occupies all of channel 33 in a tight manner and thereby forms a solid integral construction having maximum structural integrity.

Another embodiment of the thermally insulating joint construction of this invention is illustrated in FIGURES 7–10 of the drawings. Because of the basic similarity between the joint construction illustrated in FIGURES 7–10 to the joint construction 20, the overall joint construction of FIGURES 7–10 (also used as a glass support assembly) will be designated generally by the same numeral 20 as before followed by the letter designation "A" in this latter embodiment. In addition, components of glass support assembly or construction 20A practically identical to components of construction 20 will be designated by the same numerals as previously and also followed in this latter embodiment by the letter designation "A" and not described again. New components of construction 20A will be designated by a new numeral designation and described in detail.

Apparatus 50 previously illustrated and described is also used to form joint construction 20A. Apparatus 50 has been illustrated again in FIGURE 9 of the drawings in enlarged view to show more clearly the component parts of joint construction 20A and an exemplary method of making such joint construction; however, because of such previous description apparatus 50 will not be described again.

Joint construction 20A is illustrated in FIGURE 7 of the drawings in a sectional view which is similar to FIGURE 2 and shows essentially that joint construction 20A could be used interchangeably with construction 20 as the glass support assembly for window 19 of FIGURE 1.

The basic difference between joint constructions 20 and 20A is in the central solid thermal insulating member. Construction 20A has a substantially cross-shaped solid member 66A which is suitably supported between supporting surfaces 24A of members 21A and liquid plastic is flowed in channel means defined along opposite sides thereof. Upon solidifying such liquid plastic forms member means comprised of a pair of thermal members each designated by the numeral 23A.

Member 66A is preferably formed by extruding through suitable die means 67A having an opening 68A therein corresponding to the outer peripheral configuration of cross-shaped thermal insulating member 66A, see FIGURE 8.

Cross-shaped member 66A comprises a pair of substantially equal length cross members designated by the numerals 71A and 72A arranged in a symmetrical intersecting pattern bisecting each other. Opposite terminal lower end portions of member 72A, shown as the horizontal cross member in the drawings, are each designated by the numeral 73A and comprise supported surface means of member 72A.

Supported portions 73A are formed as inclined surfaces and are supported on inclined supporting surfaces 24A of an associated elongated supporting member 21A in a similar manner as supported surfaces 32 of each T-shaped member 22 are supported on associated supporting surfaces 24 of members 21.

As seen particularly in FIGURES 8–10 of the drawings, peripheral surface means comprising the vertical sides of transverse members 72A and the upper horizontal portions of such transverse member 72A cooperate with adjoining vertical surface means of the top portion of member 71A to define substantially Z-shaped surface means extending along each side of member 66A and each designated generally by the numeral 70A.

Each Z-shaped surface 70A cooperates with adjacent surface means of elongated structural member 21A, including lower surface means of its projection 25A provided therein, to define Z-shaped channel means or a pair of Z-shaped channels each designated by the numeral 76A extending in spaced apart relation along the central portion of the assembly used to form joint construction 20A, see FIGURE 9. Nozzle 65 in this example of the invention flows molten thermoplastic material 35 into the substantially Z-shaped channels 76A.

Upon cooling and solidifying, plastic material 35 forms thermal insulating member means shown as a pair of substantially Z-shaped thermal insulating members each designated by the numeral 77A. The solidified plastic material integrally formed within the substantially Z-shaped channels 76A cooperating with member 66A provides an interlocking action and firmly fastens members 21A in spaced apart relation to form thermally insulating construction 20A which has high structural strength.

A modification of joint construction 20A is illustrated in FIGURE 11 of the drawings which is identical to such joint construction with the exception that its vertical member comprising its cross-shaped member does not extend quite as far above the horizontal member of such cross-shaped member, that is, the top portion of such vertical member is recessed below a horizontal plane extending across top surface means or the top surface of projections 25A provided in each member 21A. As a result of this practically identical construction the modification of FIGURE 11 will also be designated by the numeral 20A and all component parts will be designated by the same numeral as the embodiment of FIGURES 7–10 and not described again.

The shortened upper portion of member 71A provides a recess the depth of which is indicated at 80. Molten plastic material is flowed in position in forming the modification of FIGURE 11 in an identical manner as shown in FIGURE 9 and after flowing in position to form Z-shaped members 77A such molten plastic is flowed in recess 80 and integrally interconnects such Z-shaped members upon solidification thereof.

The resulting construction is an approximately hat-shaped thermal member designated generally by the numeral 81. Hat-shaped member 81 provides a strong joint construction having a smooth outer appearance and without requiring comparatively accurate dimensional control of vertical member 71A.

Each exemplary joint construction 20 and 20A presented in this disclosure comprises a pair of elongated metallic structural members placed alongside each other in spaced apart parallel relation. Each metallic member is extruded with a groove such as a substantially U-shaped groove extending therealong and such metallic members are arranged so that the open portions of their U-shaped grooves are placed adjacent each other and corresponding parallel sides of such grooves are placed opposite each other to define a pair of supporting surface means. A preformed solid plastic thermal insulating member is inserted therebetween so that it rests on such pair of supporting surface means in a loosely fitting manner so that upper surface means thereof defines bottom wall means of channel means. A liquid plastic material is then flowed or poured in such channel means and upon solidification thereof integrally bonds or fastens the metallic members in spaced apart thermally insulated relation.

Only the main elements of apparatus 50 used to make constructions 20 and 20A have been disclosed in the drawings. It will be appreciated that a suitable base is provided to support apparatus 50 as desired as well as suitable means for moving nozzles 65 with respect to its associated channel means. If desired, nozzle 65 may be kept stationary and suitable means provided to move the assembled construction thereunder to enable flowing liquid plastic material within its associated groove means. Furthermore, apparatus 50 is inexpensive to produce, simple to operate, and utilizes components which are easy to keep in working condition.

The exemplary embodiment of the thermally insulating joint construction illustrated in FIGURES 12–17 comprises the outer frame means or outer frame for the window construction of FIGURE 1 and such outer frame construction is designated generally by the numeral 85.

Joint construction 85 is comprised of a preformed solid thermal insulating member 86 defining its central lower portion, an integrally formed thermal insulating member 87 defining its central upper portion, as seen in FIGURE 17, and a pair of structural member means or structural members 90 and 91 arranged on opposite sides thereof. Thermal insulating member 87 is formed by flowing, as by melting, a plastic material designated by the numeral 92 in both its liquid and solid form (see FIGURE 16) into channel means defined by members 86, 90, and 91 allowing it to cool and solidify as will be subsequently described in more detail.

Elongated thermally insulating member 86 has a pair of spaced apart parallel grooves each designated by the numeral 95 extending along its lower end portion. Member 86 also has a pair of oppositely arranged projections 96 each designated by the numeral 96 extending outwardly from its upper end portion. Grooves 95 and projections 96 are adapted to cooperate with portions of associated elongated metallic structural members 90 and 91 arranged on opposite sides thereof.

Elongated structural member 90 has projection means shown as a projection 100 extending therealong and an elongated substantially U-shaped groove 101 arranged adjacent to projection 100 and adapted to open in a direction generally transverse the direction in which projection 100 extends outwardly.

Member 90 is adapted to be placed along one side of thermal insulating member 86 so that its projection 100 is received within an elongated groove 95 and with such projection positioned within groove 95 member 90 is raised from the position illustrated in FIGURE 15 of the drawings to the position illustrated in FIGURE 16 so that its U-shaped groove 101 is placed in surrounding relation around an associated projection 96 extending from the same side of thermal insulating member 86 as groove 95.

Elongated structural member 91 also has projection means therein designated by the numeral 103 which is practically identical to projection 100 provided in elongated structural member 90. Structural member 91 also has substantially U-shaped groove means shown as a groove 104 which is similar to groove 101 of member 90.

Structural member 91 is positioned along the opposite side portion of member 86 in a similar manner as member 90 and extending parallel to member 90. Structural member 91 is positioned so that its projection 103 is inserted within an associated elongated groove 95 in member 86 and its groove 104 is placed in surrounding relation around a projection 96 extending from the opposite side of thermal insulating member 86.

With members 90 and 91 positioned on opposite sides of thermal insulating member 86 as shown in FIGURE 16, upper surface means of groove 101 and similar upper surface means of groove 104 cooperate to define elongated groove or channel means designated generally by the numeral 106 and formed along the upper portion of assembly 85. Bottom wall means of channel 106 is formed by the upper end portion of member 86.

Means is provided for flowing, i.e. melting in this example, liquid plastic material 92 into channel 106 formed upon assemblying members 86 and 90 and 91 together. Such means for melting such liquid plastic material 92 comprises a solid strip of suitable plastic material also designated by the numeral 92 as previously mentioned and positioned immediately above groove 106. A heat source designated generally by the numeral 110 is provided and the terminal tip of solid plastic material 92 is heated so that it melts and flows into channel 106 to thereby fill such channel.

Any excess of molten plastic 92 which is flowed above upper surface means designated generally at 111 in FIGURE 16 of the drawings, is suitably removed as by scraping to provide a joint construction having a neat appearance.

After melting solid plastic material 92 using heat source 110 and flowing it into channel 106 the solidified liquid plastic material defined thereby is designated generally by the numeral 87 as previously mentioned. The liquid plastic material 92 flows around the contours and detailed configuration of channel 106 in a similar manner as previously described in connection with the previous embodiments of this invention.

Thus, joint construction 85 of this embodiment of the invention comprises a pair of metallic members 90 and 91 arranged on opposite sides of a pair of centrally arranged cooperating members comprised of a preformed solid thermal insulating member 86 and an integrally formed thermal insulating member 87 initially poured into channel 106 in liquid form and allowed to solidify. Member 87 operates to bond or weld structural members 90 and 91 together while cooperating with member 86 to thermally insulate members 90 and 91 from each other.

Elongated structural member 90 is preferably a metallic member which is made as an integral high strength unit by extruding through suitable die means such as a die 113 as seen in FIGURE 12 of the drawings. Die 113 has opening means 114 therein corresponding to the outer configuration of member 90.

In a similar manner, elongated structural member 91 is preferably a metallic member which is made as an integral unit by extrusion through suitable die means shown as a die 115. Die 115 has opening means 116 therein corresponding to the outer peripheral configuration of elongated structural member 91.

The solid thermal insulating member 86 is also preferably formed as an integral unit by extrusion through a suitable die 117. In a similar manner as before in connection with the metallic structural members, die 117 has an opening 118 therein corresponding to the outer peripheral configuration of elongated structural member 86 and provides a thermal insulating member having high structural integrity.

The unique configuration of grooves 95 provided on opposite sides of elongated thermal member 86 enables adjoining portions, shown at 95A, of member 86 to be used effectively in holding the lower end portions of structural member 90 and 91 firmly locked in position. The upper end portions of members 90 and 91 are locked in position as illustrated in FIGURES 15 and 16 of the drawings by first positioning metallic members 90 and 91 against the outer sides or surfaces of member 86 and then flowing molten plastic material 92 within the channel 106 thus defined.

Upon solidification of liquid plastic material 92, the wedge-like construction provided by the solid member 87 thus defined holds members 90 and 91 together as a strong structural unit. The wedge-like construction of member 87 is defined by angled surface means or members shown at 120 and 121 in members 90 and 91 respectively.

In this example of the invention members 120 and 121 have ridged surface means or ridged surfaces shown at 122 and 123 respectively. It will be appreciated that the provision of ridged surfaces 122 and 123 in addition to the angled configuration of members 120 and 121 is optional and not absolutely necessary.

Thus it is seen that the method of forming the improved joint construction of this invention is of optimum simplicity and basically only requires that a pair of metallic structural members be suitably positioned together with a preformed solid thermal insulating member to define channel means therebetween. A second thermal insulating member is then integrally formed in such channel means by flowing liquid plastic in such channel means and allowing it to solidify to integrally bond the construction together as a thermally insulating joint construction.

The elongated structural members 21, 21A, 90, and 91 presented in this disclosure may be made of any suitable metal; however, because of its light weight, high strength, and resistance to corrosion such members are preferably made of aluminum or of a metal containing aluminum.

The thermal insulating members comprising the various embodiments of this invention may be made of any suitable rubber-like or plastic insulating material, such as polyethylene, polyvinylchloride, or the like, for example. In its liquid form the plastic material is preferably of a type which flows easily through a nozzle. Also, although the plastic material employed is a thermoplastic material which is melted and used as desired either by flowing through a nozzle into associated channel means or melted directly in such channel means, it will be appreciated that such liquid plastic material need not be a molten plastic but may be any liquid thermally insulating material which solidifies upon setting.

Terms such as "bottom," "top," "lower," "upper," "sides," etc., have been used in this application for ease of description and merely to correspond to the illustrations in the drawings. Such terms should not be considered as limiting the scope of this invention in any way.

Thus, it is seen that an improved thermally insulated joint construction has been provided which is of simple and economical construction and which is made using preformed solid thermal insulating member means together with cooperating integrally formed thermal insulating member means to bond together a pair of spaced apart structural members and form a high strength construction.

Further, this invention provides an improved apparatus for and method of economically making such improved joint construction.

While the form of the invention now preferred has been disclosed as required by statute, other forms may be used, all coming within the scope of the claimed subject matter which follows.

What is claimed is:

1. A thermally insulating joint construction comprising, a pair of spaced apart elongated structural member means such having supporting surface means extending therealong, first elongated terminal insulating member means having cooperating supported surface means extending therealong adapted to be supported adjacent said supporting surface means by said structural member means, said member means cooperating to define channel means, and second thermal insulating member means being formed by flowing liquid plastic material means into said channel means, said liquid plastic material means being adapted to solidify upon setting to thereby interconnect said structural member means with said thermal member means therebetween to thereby form said joint construction.

2. The joint construction as set forth in claim 1 further comprising projection means in each of said structural member means adapted to extend into said channel means, whereby surface means of each of said projection means is surrounded by said liquid plastic material means comprising said second thermal insulating member means which upon solidification thereof provides a mechanical interconnection of high strength between said structural member means and said thermal insulating member means.

3. The joint construction as set forth in claim 2 in which said first elongated thermal insulating member means is made as an integral solid unit and said liquid plastic material means comprises a thermoplastic material which is melted and flowed in said channel means in its liquid state and upon cooling thereof solidifies to weld said members together as an integral construction having optimum thermal insulating qualities.

4. The joint construction as set forth in claim 2 in which said first elongated thermal insulating member means comprises a substantially T-shaped member wherein opposite terminal lower end portions of its transverse bar means define said supported surface means and upper surface means of said transverse bar means defines bottom wall means which together with adjoining surface means of said structural member means including lower surface means of said projection means define said channel means having a substantially inverted T-shaped outline and said molten thermoplastic material defining said second thermal insulating member means is easily flowed within said inverted T-shaped outline.

5. The joint construction as set forth in claim 4 in which said supporting surface means in said pair of structural member means comprise inclined surface means and said supported surface means in said first insulating member means comprise corresponding inclined supported surface means, whereby said inclined surface means cooperate to provide a stronger joint construction.

6. The joint construction as set forth in claim 2 in which said first elongated thermal insulating member means comprises a substantially cross-shaped member defined by a pair of substantially equal length cross members arranged in a symmetrical intersecting pattern bisecting each other, wherein opposite terminal lower end portions of one of said cross members define said supported surface means and surface means of said one cross member and adjoining surface means of the other cross member of said pair of cross members cooperate with adjacent surface means and with said projection means of an associated elongated structural member means to define a substantially Z-shaped channel along each side of said cross-shaped member, with said Z-shaped channels defining said channel means, and said second thermal insulating member means is comprised of two substantially Z-shaped sections each formed upon flowing said molten thermoplastic material into said Z-shaped channels which upon solidifying provides an interlocking action to define said joint construction having high structural strength.

7. The joint construction as set forth in claim 6 in which said other cross member is recessed with respect to a plane extending across outer surface means of said projection means in said pair of elongated structural member means, whereby said recessed cross member enables said molten thermoplastic material to extend across said recessed cross member and interconnected said Z-shaped sections to define a roughly hat-shaped second thermal insulating member means upon cooling and solidification thereof.

8. An apparatus for making a thermally insulating joint construction comprised of a pair of spaced apart elongated structural member means each having supporting surface means and first and second thermal insulating member means comprising, supporting means for supporting said pair of structural member means in parallel spaced apart relation so that said supporting surface means thereof are arranged in supporting relation to support cooperating surface means of said first thermal insulating member means therebetween and define elongated channel means, positioning means for positioning said pair of structural member means and said first thermal insulating member means in aligned relation to fix the configuration of said channel means, and flowing means for flowing liquid plastic material means into said channel means which is adapted to solidify upon setting thereof to form said second thermal insulating member means and interconnect said member means together and define said joint construction having high structural strength.

9. An apparatus as set forth in claim 8 in which said supporting means comprises horizontally arranged supporting block means supporting said channel means horizontally.

10. An apparatus as set forth in claim 9 in which said liquid plastic material comprises a molten thermoplastic material and said flowing means comprises supply means for supplying said molten thermoplastic material and nozzle means interconnected to said supply means and arranged to flow said molten thermoplastic material in said horizontal channel means, whereby said positioning means is held actuated until said molten thermoplastic material cools and solidifys to define said second thermal insulating member means and form said joint construction.

11. An apparatus as set forth in claim 10 in which said supporting block means comprises first and second supporting blocks adapted to support an associated elongated structural member means, said first supporting block being horizontally movable toward an associated second supporting block by said positioning means to clamp and rigidly hold a portion of said associated elongated structural member therebetween and hold said associated structural member in said aligned relation.

12. The apparatus as set forth in claim 11 in which said positioning means comprises actuator means engaging said first supporting block and urging it horizontally toward its associated second supporting block.

13. The apparatus as set forth in claim 11 further comprising urging means for initially yieldingly holding said first and second supporting blocks in spaced apart relation to enable easy insertion of said portion of said associated elongated structural member means therebetween and wherein said positioning means overrides said urging means to position its associated structural member means.

14. A method of making a thermally insulating joint construction comprising the steps of, providing a pair of elongated structural member means each having supporting surface means, providing first thermal insulating member means, providing supporting means, supporting said pair of structural member means with said supporting means to there arrange said structural member means in parallel spaced apart relation so that said supporting surface means thereof are arranged in supporting relation to support cooperating supporting surface means of said first thermal insulating member means therebetween and define elongated channel means, providing positioning means, positioning said pair of structural member means and said first thermal insulating member means with said positioning means to properly align and fix the configuration of said channel means, providing liquid plastic material means, providing flowing means for flowing said liquid plastic material means, and flowing said liquid plastic material in said channel means to define second thermal insulating member means, said second thermal insulating member means being adapted to solidify and interconnect said members together thereby forming said joint construction having high structural strength.

15. The method as set forth in claim 14 in which said step of providing liquid plastic material means comprises providing a molten thermoplastic material which solidifys upon cooling to normal ambient temperatures.

16. The method as set forth in claim 14 in which said step of providing supporting means comprises providing horizontally arranged supporting block means and said supporting step comprises placing said structural member means on said supporting block means to thereby arrange said channel means horizontally.

17. The method as set forth in claim 15 in which said step of providing flowing means comprises providing supply means for supplying said molten thermoplastic material and nozzle means interconnected to said supply means, and comprising the further step of placing said nozzle means in flow relation above said channel means to flow said molten thermoplastic material in said horizontal channel means, and said positioning step comprises holding said positioning means actuated until said molten thermoplastic material cools and solidifies to thereby form said joint construction.

18. The method as set forth in claim 17 in which said step of providing first thermal insulating member means comprises providing a substantially T-shaped thermal insulating member in which opposite terminal lower end portions of its transverse bar means define said supported surface means.

19. The method as set forth in claim 17 in which said step of providing first thermal insulating member means comprises providing a substantially cross-shaped thermal insulating member in which opposite terminal lower end portions of a cross member comprising said cross-shaped member define said supported surface means.

20. The method as set forth in claim 17 in which said step of placing said nozzle means in flow relation above said channel means comprises relatively moving said nozzle means along the full length of said channel means with the discharge end of said nozzle means immediately adjacent said channel means.

21. The method as set forth in claim 17 in which, said step of providing supporting block means comprises providing first and second supporting blocks adapted to support an associated elongated structural member means, said first supporting block being horizontally movable toward said second supporting block, and said positioning step comprises moving said first supporting block with said positioning means to clamp and rigidly hold a portion of said associated elongated structural member therebetween and hold said associated structural member in said aligned relation.

22. The method as set forth in claim 21 in which said step of providing positioning means comprises providing actuating means adapted to engage a portion of said first supporting block and urge it horizontally toward said second associated supporting block.

References Cited
UNITED STATES PATENTS

| | | | |
|---|---|---|---|
| 3,141,206 | 7/1964 | Stephens | 52—403 |
| 3,156,332 | 11/1964 | Cameron | 52—403 |
| 3,212,179 | 10/1965 | Koblensky | 52—403 |

FOREIGN PATENTS

| | | |
|---|---|---|
| 1,086,875 | 8/1960 | Germany. |

REINALDO P. MACHADO, *Primary Examiner.*